(12) United States Patent
Tsukagoshi et al.

(10) Patent No.: US 10,470,472 B2
(45) Date of Patent: Nov. 12, 2019

(54) METHOD FOR REMOVING GUTS OF FISH BODY AND DEVICE FOR SAME

(71) Applicant: TOYO SUISAN KIKAI CO., LTD., Osaka (JP)

(72) Inventors: Tomoyori Tsukagoshi, Osaka (JP); Takashi Uchita, Osaka (JP)

(73) Assignee: TOYO SUISAN KIKAI CO., LTD., Osaka (JP)

( * ) Notice: Subject to any disclaimer, the term of this patent is extended or adjusted under 35 U.S.C. 154(b) by 0 days.

(21) Appl. No.: 16/091,149

(22) PCT Filed: Apr. 5, 2017

(86) PCT No.: PCT/JP2017/014250
§ 371 (c)(1),
(2) Date: Oct. 4, 2018

(87) PCT Pub. No.: WO2017/175800
PCT Pub. Date: Oct. 12, 2017

(65) Prior Publication Data
US 2019/0124936 A1    May 2, 2019

(30) Foreign Application Priority Data

Apr. 6, 2016 (JP) ................................ 2016-076551

(51) Int. Cl.
*A22C 25/00* (2006.01)
*A22C 25/14* (2006.01)
(Continued)

(52) U.S. Cl.
CPC ............ *A22C 25/145* (2013.01); *A22C 25/02* (2013.01); *A22C 25/08* (2013.01); *A22C 25/12* (2013.01); *A22C 25/14* (2013.01)

(58) Field of Classification Search
CPC ........ A22C 25/00; A22C 25/14; A22C 25/145
(Continued)

(56) References Cited

U.S. PATENT DOCUMENTS 3,178,376 A * 4/1965 Cook ..................... C08G 61/00
528/395
4,630,335 A * 12/1986 Claudon ................ A22C 25/14
452/110

(Continued)

FOREIGN PATENT DOCUMENTS

JP        3037532       4/2000
JP        2006-197893   8/2006

OTHER PUBLICATIONS

International Search Report dated May 16, 2017 in International (PCT) Application No. PCT/JP2017/014250.

*Primary Examiner* — Richard T Price, Jr.
(74) *Attorney, Agent, or Firm* — Wenderoth, Lind & Ponack, L.L.P.

(57) ABSTRACT

A method and apparatus for removing guts of a fish body, the method includes: transferring a fish body A, with a head cut off and removed, by a transfer device and cutting open the abdomen thereof with an abdominal blade on the way of transfer; transferring the fish body to a gut removal member and causing membrane separation blades, provided at an upper end portion of the gut removal member, to enter in between a peritoneal membrane portion on both sides of the vertebra and a fish meat inner wall on a head cut-off section of the fish body; swinging the gut removal member downwardly with its lower end portion as fulcrum to tilt the membrane separation blades from the horizontal state and peel off the peritoneal membrane portions from the fish meat inner wall; and shaking off downwardly the guts adhered to the peritoneal membrane portions.

8 Claims, 14 Drawing Sheets

(51) Int. Cl.
*A22C 25/02* (2006.01)
*A22C 25/08* (2006.01)
*A22C 25/12* (2006.01)

(58) Field of Classification Search
USPC .................................. 452/106, 119–121, 123
See application file for complete search history.

(56) References Cited

U.S. PATENT DOCUMENTS

| | | | |
|---|---|---|---|
| 5,413,524 A | 5/1995 | Yoshida | |
| 8,512,106 B2* | 8/2013 | Ryan | A22C 25/147 |
| | | | 452/121 |
| 8,814,637 B2* | 8/2014 | Jurs | A22C 25/16 |
| | | | 452/162 |
| 8,956,205 B2* | 2/2015 | Kowalski | A22C 25/16 |
| | | | 452/135 |

* cited by examiner

METHOD FOR REMOVING GUTS OF FISH BODY AND DEVICE FOR SAME

TECHNICAL FIELD

The present invention relates to a gut removal method for removing guts from the abdomen of a fish body such as yellowtail or bonito with the head cut off and a device for performing the method.

BACKGROUND ART

Conventionally known as a device for removing guts from the abdomen of a fish body with the head cut off without damaging the same is, for example, the invention described in Patent Literature 1.

The device is provided with a transfer device for a fish body with the head cut off and removed. From the transfer start side (upstream) toward the transfer terminal side (downstream) of the transfer device, a cutting blade for the abdomen of the fish body; and a separation blade that has an inverted-U shape in cross section and is configured to peel off the peritoneal membrane adhered to the inner wall of the fish meat exposed on a head cut-off section are sequentially disposed. The device is further provided with: a member, provided upstream of the cutting blade, configured to guide the fish body to the cutting blade while maintaining the fish body in a predetermined attitude; and a guide member, provided upstream of the membrane separation blade, configured to carry the vertebra of the fish body so that the peritoneal membrane is positioned under the membrane separation blade and guide the same toward the separation blade through the fish body.

When a fish body with the head cut off and removed is supplied, with the head cut-off section oriented toward downstream, to the transfer start side of the transfer device of the gut removal device thus configured, the fish body is fed to the cutting blade while being retained by a guide member in a predetermined attitude, and is then cut open by the cutting blade. The fish body with the abdomen cut open is fed to the membrane separation blade while the vertebra exposed on the head cut-off section is placed on and along the guide member, so that the tip of the membrane separation blade enters in between the inner wall of the fish meat and the peritoneal membrane. As the fish body is moved downstream, the membrane separation blade peels off the peritoneal membrane from the inner wall of the fish meat while entering deep along the lower surface of the vertebra.

When the tip of the membrane separation blade passes through the abdominal cavity, the peritoneal membrane is perfectly peeled off from the inner wall of the fish body, so that the guts adhered to the inner surface of the peritoneal membrane are dropped downwardly out of the abdominal cavity and thus removed in conjunction with the peritoneal membrane.

CITATION LIST

Patent Literature

Patent Literature 1: Japanese Patent No. 3037532

SUMMARY OF INVENTION

Technical Problem

However, according to the gut removal device for a fish body, the tip of the membrane separation blade formed in an inverted-U shape in cross section is caused to enter in between the inner wall and the peritoneal membrane of the fish body, and then the peritoneal membrane is peeled off along the inner wall of the fish meat of the fish body as the fish body is transferred downstream while the upper portion of the peritoneal membrane is kept covered by the membrane separation blade. Thus, it was extremely difficult to cause the membrane separation blade to accurately enter along the peritoneal membrane that is curved in an arcuate shape from the head cut-off section to the anus of the fish body. Furthermore, since the width of the abdominal cavity of the fish body having been cut open is gradually narrowed from the head cut-off section toward the anus, the membrane separation blade having an inverted-U shape in cross section cannot be placed along the entire length of the peritoneal membrane. Thus, the membrane separation blade would be deeply engaged with the fish meat on the way of peeling off the peritoneal membrane and thereby damage the fish meat. Furthermore, the peritoneal membrane would be broken with the tip of the membrane separation blade, so that the peritoneal membrane could not be highly accurately peeled off with the guts adhered thereto.

Furthermore, even when the fish body passed along the membrane separation blade, the guts would not be dropped off from the peritoneal membrane but would be kept hooked on the membrane separation blade. This would make it impossible to remove the guts of another fish body in the next operation, so that the operation of the device had to be stopped and the worker had to manually remove the guts and restart the device, which lead to degradation in work efficiency.

The present invention has been developed in view of such problems. It is therefore an object of the invention to provide a method for removing guts of a fish body and a device for performing the method, the method enabling the peeling off and removal of the guts from the abdominal cavity of the fish body with the head cut off and removed, with accuracy and improved efficiency, while the guts are kept adhered to the peritoneal membrane.

Means for Solving Problem

A method of the present invention for removing guts of a fish body includes the steps of: transferring a fish body with a head cut off and removed while a head cut-off section is oriented in a transfer direction and an abdomen is kept oriented downwardly; cutting open the abdomen of the fish body on the way of transferring the fish body; feeding the fish body with the abdomen cut open to a gut removal member that is provided, on an upper end thereof, with a pair of right and left membrane separation blades; causing the pair of right and left membrane separation blades to enter, in the feeding step, in between a side portion of a peritoneal membrane and a fish meat inner wall on both sides of a vertebra exposed on the head cut-off section of the fish body; and downwardly tilting the gut removal member on the way of the entering step and then peeling off the peritoneal membrane having an inner surface, to which guts are adhered, from the fish meat inner wall by the membrane separation blades and shaking off the peritoneal membrane in conjunction with the guts.

In the method for removing guts of a fish body the invention is characterized in that side separation blades are provided at outer end lower portions of the pair of right and left membrane separation blades of the gut removal member by intermediary of a wedge-shaped gap, an outer end portion of both sides of the peritoneal membrane is engaged in the wedge-shaped gap between the membrane separation blade and the side separation blade, and the gut removal member is tilted from this state to peel off the peritoneal membrane with the membrane separation blades and side separation blades.

Furthermore, the invention is characterized in that an abdominal cavity widening member is provided on the way in which the fish body with the abdomen cut open is transferred to the gut removal member, and the fish body is transferred to the gut removal member while the abdominal cavity thereof is being widened by the abdominal cavity widening member.

The invention is characterized in that a rotational brush for cleaning the abdominal cavity of the fish body is provided on the way in which the fish body with the guts removed is transferred, and when the fish body has reached the rotational brush for cleaning the abdominal cavity, the rotational brush for cleaning the abdominal cavity is moved upwardly to remove kidney or remains left inside the abdominal cavity.

The invention is a device for performing the method for removing guts of a fish body as described above. The device is characterized by including: a transfer device configured to transfer a fish body, with a head cut off and removed, while a head cut-off section is oriented in a transfer direction and an abdomen thereof is kept oriented downwardly; an abdominal blade which is provided upstream of the transfer device and cuts open the abdomen of the fish body with the head cut off and removed; a gut removal member provided downstream of the abdominal blade and capable of being tilted downwardly, the gut removal member being provided, on an upper end thereof, with a pair of right and left membrane separation blades to be caused to enter in between a peritoneal membrane portion and a fish meat inner wall that are present on both sides of a vertebra of the fish body; and a guide member disposed upstream of the gut removal member, the guide member being configured to carry the vertebra of the fish body with the abdomen cut open and feed the vertebra to the membrane separation blades so that the peritoneal membrane portions on both sides of the vertebra are opposed to the pair of right and left membrane separation blades of the gut removal member.

In the device for removing guts of a fish body configured as described above is characterized in that the gut removal member is provided, on an outer end of the pair of right and left membrane separation blades, with a side separation blade having a tapered blade portion with the tip formed at an acute end by intermediary of a wedge-shaped gap for receiving the peritoneal membrane of the fish body oriented downwardly; and a side plate is vertically provided downwardly from these side separation blades, a backplate is provided between end portions facing downstream of these side plates, and a space surrounded by the side plates on both sides and the backplate is formed as a space for receiving the guts of the fish body.

Furthermore, the invention is characterized in that below the guide member disposed upstream of the gut removal member, disposed is an abdominal cavity widening member configured to guide the fish body toward the membrane separation blades while widening the abdominal cavity of the fish body with the abdomen cut open to be wider than an interval between the side plates on both sides of the gut removal member.

Furthermore, the invention is characterized in that downstream of the gut removal member, a rotational brush configured to clean the abdominal cavity to remove kidney or remains inside the abdominal cavity of the fish body with the guts having been removed is disposed to be vertically movable.

Advantageous Effects of Invention

According to the method and device for removing guts of a fish body of the present invention, on the way in which the fish body with the head cut off and removed is transferred by the transfer device, the abdomen is cut open by the abdominal blade. Then, the pair of right and left membrane separation blades provided on the upper end of the gut removal member are caused to enter in between both side portions of the peritoneal membrane and a fish meat inner wall exposed on a head cut-off section of the fish body. The gut removal member is tilted downwardly upon the entry. While the tip of the pair of right and left membrane separation blades is hooked on a peritoneal membrane portion provided on both sides of the vertebra of the fish body, these peritoneal membrane portions can thus be peeled off, at the same time by a uniform peeling force, from the fish meat inner wall in conjunction with guts adhered to the inner surface thereof. Furthermore, the peritoneal membrane having been peeled off can be removed with reliability by being shaken off from the membrane separation blades by means of the tilting force of the membrane separation blades with the help of the weight of guts adhered to the inner surface of the peritoneal membrane.

For the peritoneal membrane of the fish body, the peritoneal membrane portions present on both sides of the vertebra are thicker and harder than other portions, and guts are adhered to the inner surface (lower surface) of the peritoneal membrane portions. Thus, peeling off the peritoneal membrane portions with the pair of right and left the membrane separation blades makes it possible to remove the guts, the upper circumferential surface of which is adhered to the peeled off peritoneal membrane portions, readily with reliability in conjunction with the peritoneal membrane portion.

Furthermore, according to the inventions of the present invention, on the outer ends of the pair of right and left membrane separation blades of the gut removal member, the side separation blades are provided consecutively substantially at right angles by intermediary of a wedge-shaped gap and are oriented downwardly; the membrane separation blades and the side separation blades are caused to enter respectively into the upper and lower sides of the peritoneal membrane portion present on both sides of the vertebra of the fish body being transferred by the transfer device to receive the tip portion of the peritoneal membrane in the wedge-shaped gap. After that, the peritoneal membrane is peeled off by tilting the gut removal member downwardly while the membrane separation blades, which are engaged in the wedge-shaped gap between the membrane separation blade and the side separation blade, are hooked on both side portions of the peritoneal membrane. It is thus possible to strongly apply the tilting force of the gut removal member to the membrane separation blade and the side separation blade as a force for peeling off the peritoneal membrane from the fish meat inner wall. The peritoneal membrane, to the inner surface of which guts are adhered, can be peeled off and removed positively with efficiency.

Furthermore, the gut removal member is configured such that the side plate is provided vertically at the lower end of the side separation blade provided on the outer end lower portion of the pair of right and left membrane separation blades to provide a space for receiving the guts of the fish body in between the opposing inner surfaces of these both side plates, and as well, a backplate is provided between the end portions facing the downstream side of the side plates. Thus, when the gut removal member is tilted to peel off the peritoneal membrane of the fish body by the pair of right and left membrane separation blades, the guts adhered to the inner surface of the peritoneal membrane are received in the space surrounded by the side plates and the backplate. After that, it is possible to positively shake off the guts from inside the space by the tilting force of the side plates on both sides of the gut removal member.

According to the inventions, on the way in which the fish body with the abdomen cut open is transferred to the membrane separation blades, provided is the abdominal cavity widening member that guides the fish body to the gut removal member while the abdominal cavity the fish body is being widened so as to be wider than the interval between the side plates on both sides of the gut removal member. It is thus possible to feed the fish body to the gut removal member while the abdominal cavity of the fish body is kept widened to a predetermined width by the abdominal cavity widening member.

In addition to this, it is possible to place the side plates of the gut removal member along the inner surface of the abdominal cavity widening member to take the guts smoothly with reliability into the space between these side plates. When the gut removal member is tilted, the peritoneal membrane can also be peeled off by the membrane separation blades and the side separation blades, and at the same time, the guts taken into the space between the side plates can be shaken off and removed from the space with reliability.

Furthermore, according to the inventions of claim 4 and claim 8, the rotational brush for cleaning the abdominal cavity is disposed, vertically movably downstream of the gut removal member, to remove kidney or remains inside the abdominal cavity of the fish body with the guts removed. It is thus possible to forcedly push the rotational brush for cleaning the abdominal cavity against the inner surface of the abdominal cavity and thereby readily remove guts or kidney left not only inside the abdominal cavity toward the cut-off head of the fish body but also in the anus portion reduced in the width of the abdominal cavity.

DESCRIPTION OF EMBODIMENTS

Figure 1:
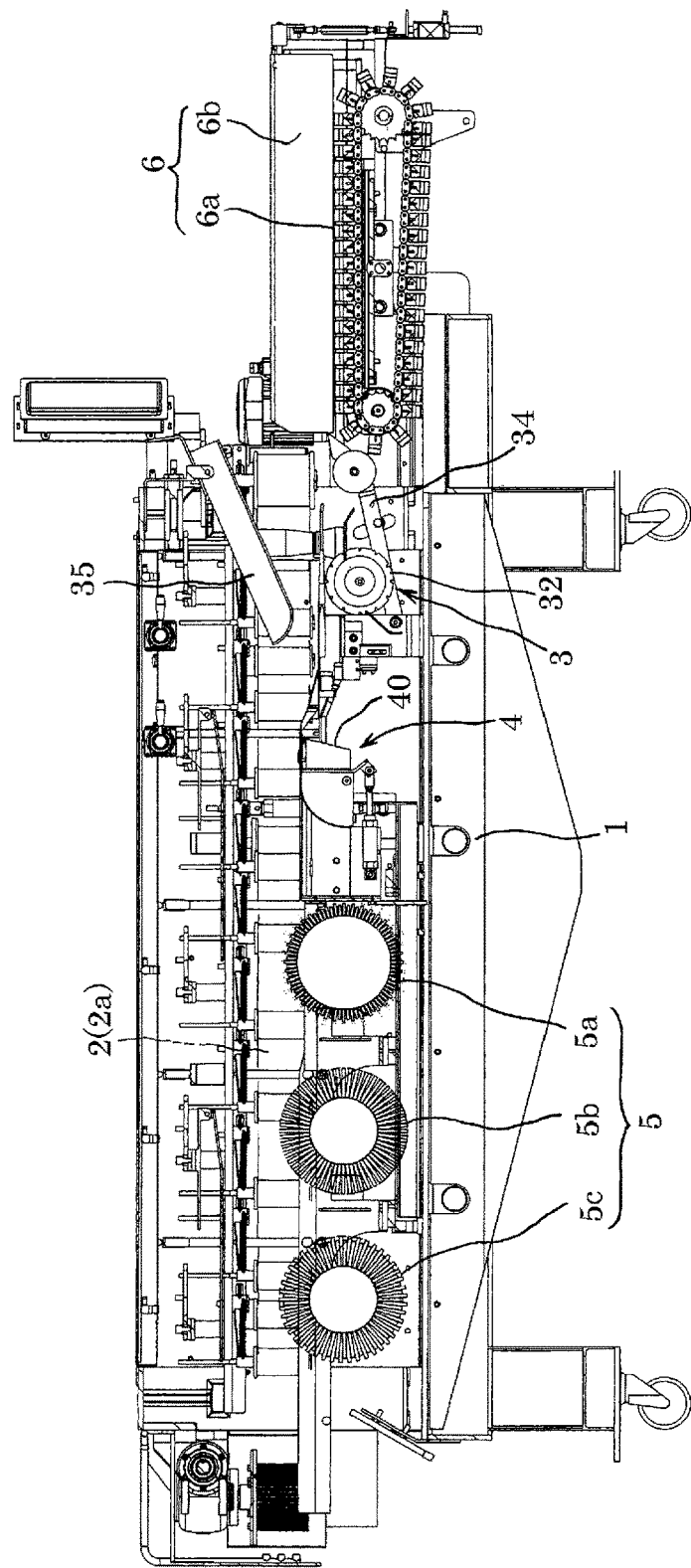
FIG. 1 is a side view illustrating an entirety of a gut removal device of the present invention.
Figure 2:
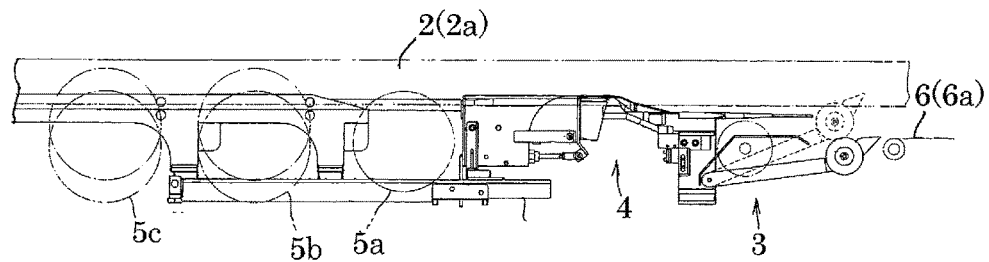
FIG. 2 is a schematic side view illustrating an abdomen sectioning device, a gut removal device, and a remains (such as kidney) removal device, which are sequentially disposed in a transfer direction.

A specific example of the present invention will now be described on the basis of the drawings. In FIG. 1 and FIG. 2, a transfer device 2 including a pair of right and left sandwiching belts 2a, 2a is disposed at the center of a machine table 1. The transfer device 2 sandwiches and holds a fish body A, such as yellowtail with the head cut off and removed, and transfers the same from one end to the other of the machine table 1 in the lengthwise direction. Furthermore, from the one end of the machine table 1, i.e., the end at which the sandwiching belts 2a, 2a start to transfer the fish body toward the other end of the machine table 1, i.e., the end at which the transfer is ended, sequentially disposed are an abdomen sectioning device 3, a gut removal device 4, and a remains (such as kidney) removal device 5.

Note that as is well-known, the pair of right and left sandwiching belts 2a, 2a are stretched tightly by intermediary of a plurality of guide pulleys between a drive pulley and a follower pulley which are rotatably disposed at both ends of the machine table 1. The drive pulley is rotated by a drive motor at a constant speed so that the belts run and circulate endlessly between the drive pulley and the follower pulley.

Furthermore, on the one end side of the machine table 1, disposed is a supplying device 6 configured to supply the fish body A to the transfer start portion of the transfer device 2 while orienting a head cut-off section A1 of the fish body in the direction of transfer and holding the abdomen of the fish body downwardly.

Figure 3:
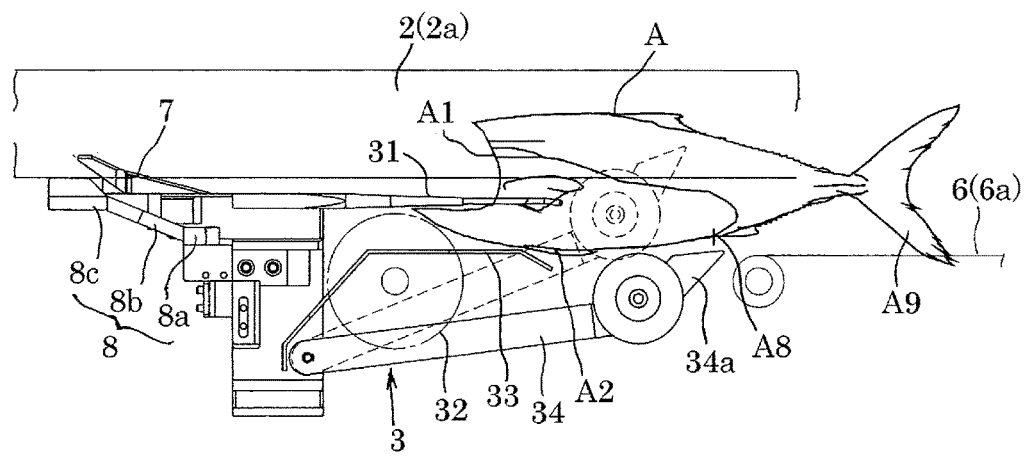
FIG. 3 is a side view illustrating a fish body being transferred to the abdomen sectioning device.
Figure 4:
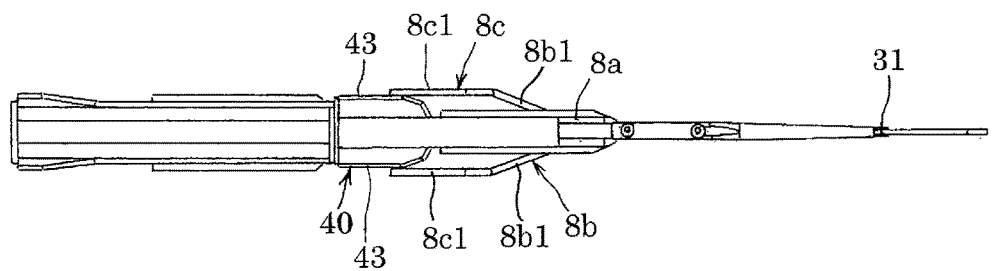
FIG. 4 is a plan view illustrating a horizontal guide bar and an abdominal cavity widening member.

As illustrated in FIG. 3 and FIG. 4, the abdomen sectioning device 3 is provided with the following: a horizontal guide bar 31 which is elongated in the transfer direction of the fish body A and disposed below the center of the space between the sandwiching belts 2a, 2a, which constitute the transfer device 2, in parallel to the sandwiching belts 2a, 2a; a circular abdominal blade 32 which is rotatably disposed below the center of the horizontal guide bar 31 in the lengthwise direction thereof with the upper circumference located close to the horizontal guide bar 31; a horizontal guide frame 33 which is disposed below the horizontal guide bar 31 from both sides of the abdominal blade 32 toward upstream and is configured to support the abdomen of the fish body A and guide the same to the abdominal blade 32; a push-up lever 34 which is disposed below the horizontal guide frame 33 and configured to push the tail side of the fish body A upwardly so as to position the fish body A in an attitude for being cut open; and a pressing member 35

(illustrated in FIG. 1) which is disposed above the horizontal guide bar 31 and configured to press elastically the back of the fish body A downwardly.

The tips of the horizontal guide bar 31 and the horizontal guide frame 33 are pointed toward the transfer start portion of the fish body A, that is, toward upstream. The push-up lever 34 allows the proximal end portion oriented toward downstream to be provided on the machine table 1 so as to be swingable up and down and allows the distal end portion oriented toward upstream to be projected toward more upstream than the tips of the horizontal guide bar 31 and the horizontal guide frame 33. The push-up lever 34 has, on the projected end, a push-up member 34a configured to push up the lower surface from the abdomen A2 to the tail A9 of the fish body A being transferred onto the horizontal guide frame 33.

Figure 5:
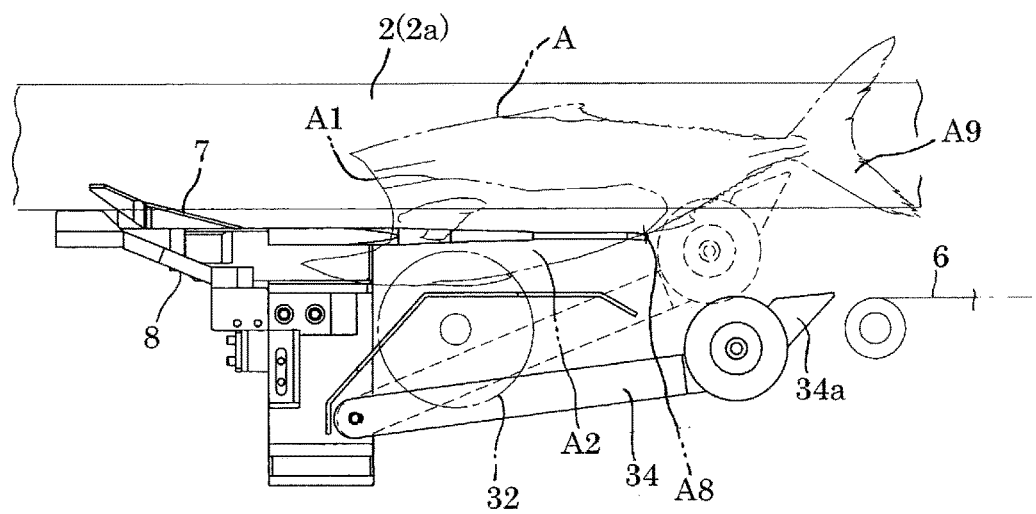
FIG. 5 is a side view illustrating an abdomen sectioning process being performed.

Furthermore, the horizontal guide bar 31 is provided with a portion with a length which extends from the tip thereof to the vicinity of the abdominal blade 32, the portion being formed to be reduced in diameter and round in cross-section. While the tip of the horizontal guide bar 31 is allowed to enter, as the fish body A is transferred, into the center of the head cut-off section A1 of the fish body A being transferred by the transfer device 2, the abdomen A2 of the fish body A is placed on the horizontal guide frame 33. Then, while the push-up lever 34 is swung upwardly to allow the push-up member 34a to lift up the tail A9 of the fish body A with a fulcrum located on the horizontal guide frame 33, the horizontal guide bar 31 is penetrated via the abdominal cavity A3 of the fish body A through the anus A8 of the fish body A. While this state is being held, as illustrated in FIG. 5, the abdomen A2 of the fish body A is cut open with the abdominal blade 32.

Figure 6:
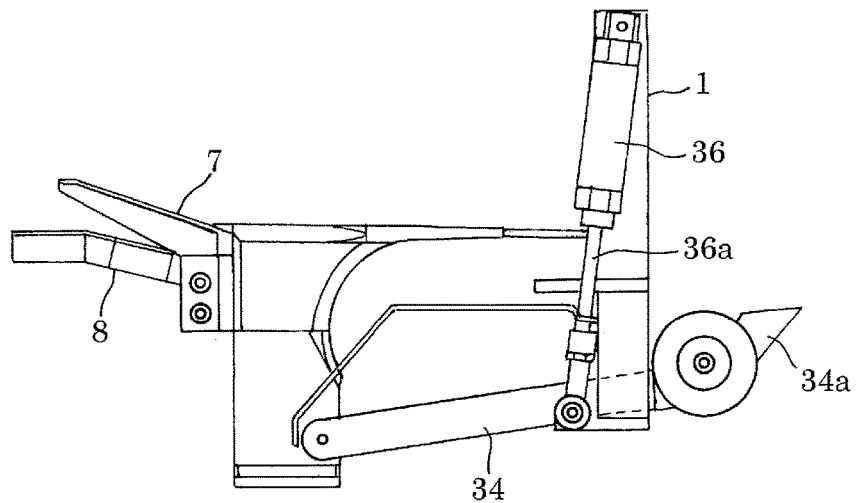
FIG. 6 is a side view illustrating a driving device for a push-up lever in the abdomen sectioning device.

Note that as illustrated in FIG. 6, the driving device of the push-up lever 34 is provided with a fluid pressure cylinder 36 such as an air cylinder having the upper end supported on the machine table 1. The tip end of the piston rod 36a of the fluid pressure cylinder 36 is coupled to an intermediate portion in the lengthwise direction of the push-up lever 34. The piston rod 36a caused to be extended and contracted causes the push-up lever 34 to be swung up and down with the proximal end portion serving as the fulcrum.

Figure 7:
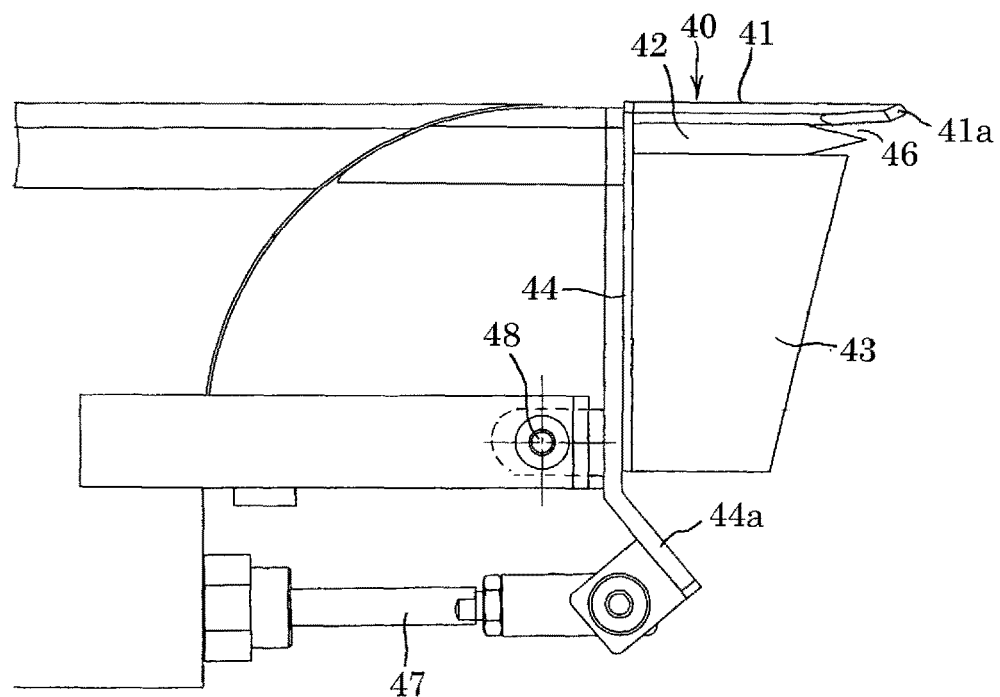
FIG. 7 is a side view illustrating the gut removal device.

As illustrated in FIG. 7, the gut removal device 4 configured to remove guts A4 adhered to the peritoneal membrane from inside the abdominal cavity A3 of the fish body A having been cut open is constituted of a gut removal member 40 which is provided downstream of the abdomen sectioning device 3 in the transfer direction of the fish body A, and a driving device 47 for the gut removal member 40. Note that concerning the peritoneal membrane of the fish body A, peritoneal membrane portions A5, A5 (see FIG. 13) found on both sides of the vertebra are greater in thickness and harder than the other portions, and guts have been attached to the inner surface (lower surface) of the peritoneal membrane portions A5, A5.

As shown in FIG. 8 to FIG. 12, the gut removal member 40 is provided with the following: a pair of membrane separation blades 41, 41 which are disposed horizontally with a certain interval therebetween and each have a distal blade portion 41a oriented toward upstream; side separation blades 42, 42 which are consecutively provided on the outer ends of the membrane separation blades 41, 41 substantially at right angles in the downward direction, respectively; both right and left side plates 43, 43 of which upper ends are consecutively integrated with the lower ends of the side separation blades 42, 42 and provided downwardly from the side separation blades 42, 42, respectively; and a backplate 44 which connects between the ends of the side plates 43, 43 facing downstream thereof. A space 45 surrounded by the side plates 43, 43 on both sides and the backplate 44 is formed to be spacious enough to receive the guts of the fish body A. The space 45 is fully opened toward upstream and downwardly between the tips and the lower ends of the side plates 43, 53.

The pair of right and left membrane separation blades 41, 41 and the side separation blades 42, 42 of the gut removal member 40 are formed of a thin rectangular steel plate that is elongated in the transfer direction of the fish body A. The membrane separation blades 41, 41 are formed to be rectangular in plan view and have the blade portions 41a that are formed on the distal end portions oriented toward upstream from the distal end surface to the inner and outer side surfaces, and as well, formed so that an inner corner of the distal end surface serves as a cutting blade. The gut removal member 40 is disposed on the machine table 1 so that the distal blade portions 41a, 41a on both sides are positioned to be opposed to between the peritoneal membrane portion A5, A5 and a fish meat inner wall A7 which are present on both sides of a vertebra A6 that is exposed to a head cut-off section A5 of the fish body A (see FIG. 14).

On the other hand, the side separation blades 42, 42 are formed to be rectangular in a side view, and as well, the distal end portions of the side separation blades 42 are formed to be tapered blade portions 42a with the tip formed on an acute end. Between the blade portion 4a and the outer side end surface of the distal blade portion 41a of the membrane separation blade 41, a wedge-shaped gap 46 that is capable of receiving the tip of the outer end portion of the peritoneal membrane portion A5, A5 of the fish body A is provided.

Figure 8:
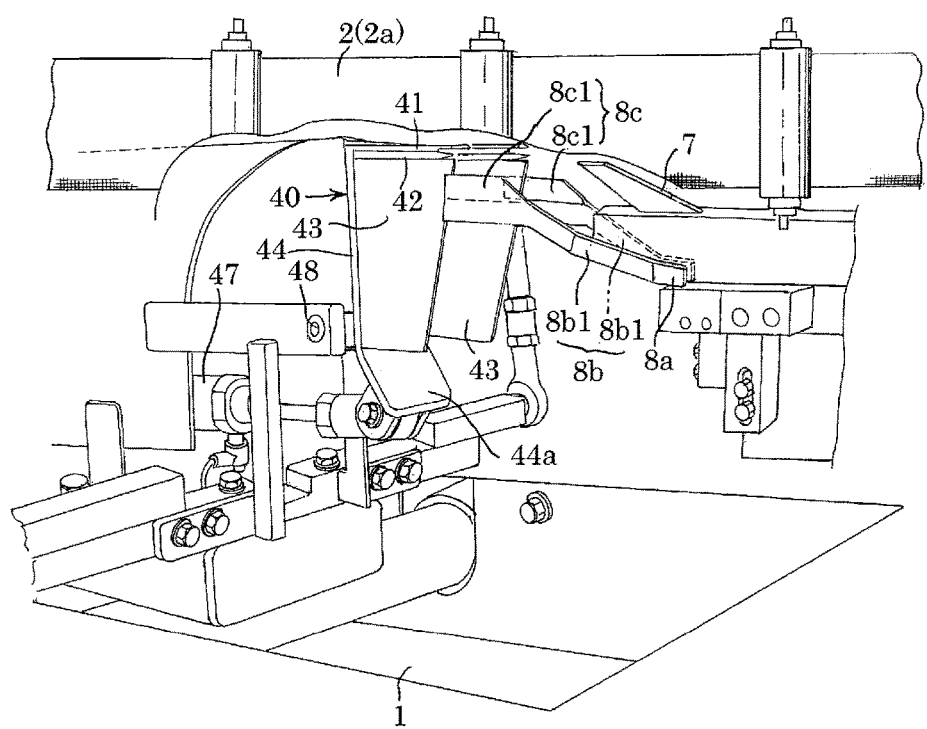
FIG. 8 is a perspective view illustrating the same.
Figure 9:
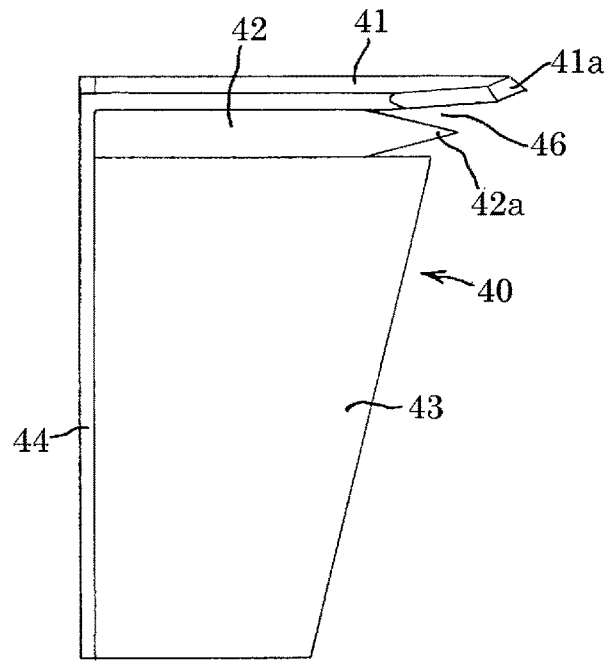
FIG. 9 is a side view illustrating the gut removal member.
Figure 10:
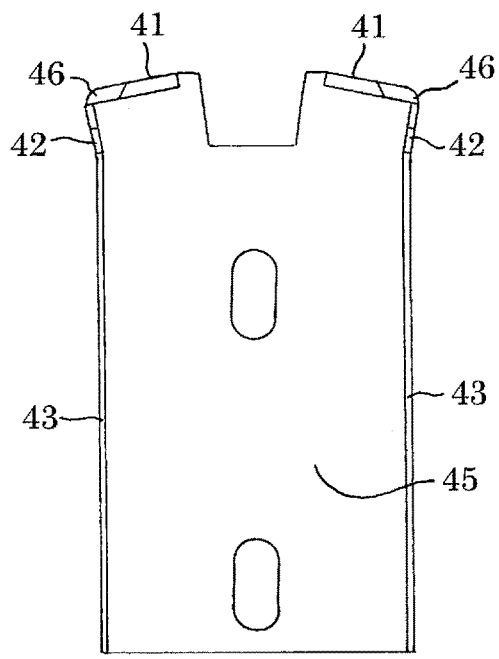
FIG. 10 is a front view illustrating the same.
Figure 11:
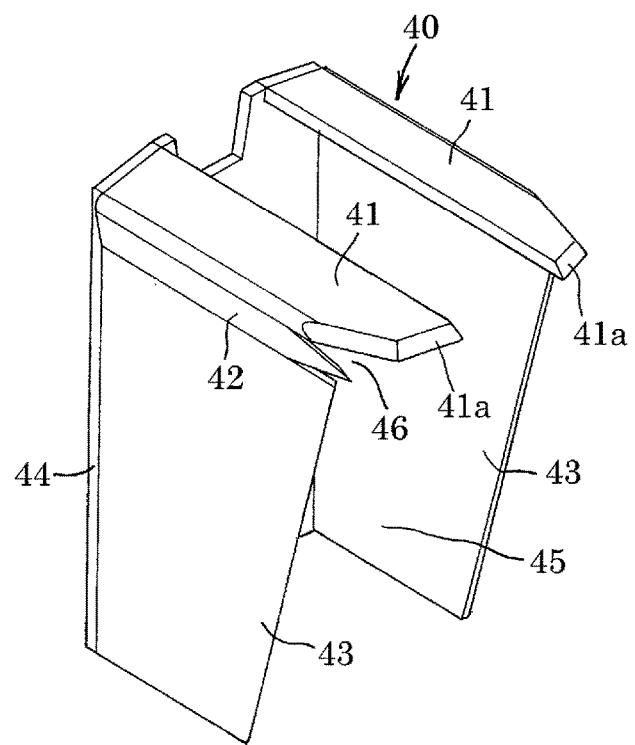
FIG. 11 is a perspective view.
Figure 12:
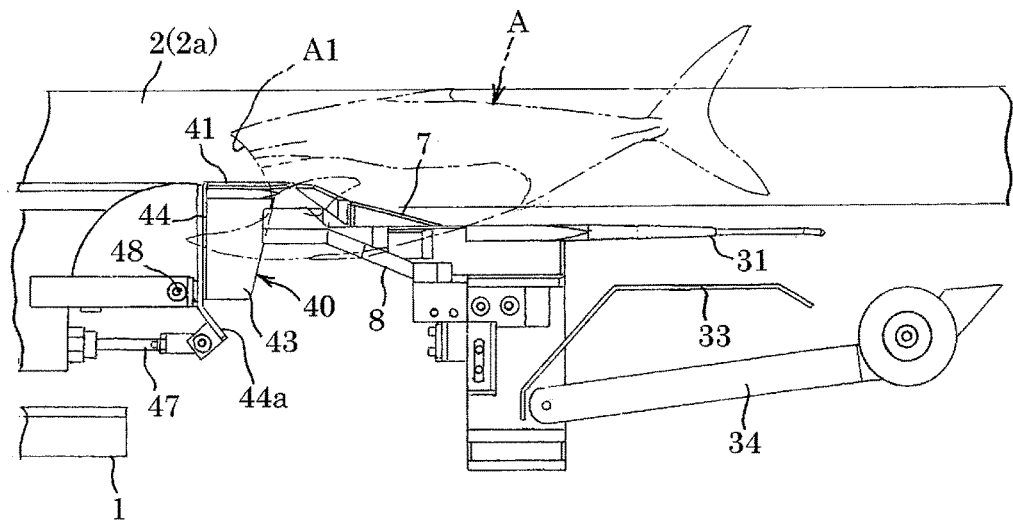
FIG. 12 is a side view illustrating a state immediately before guts are removed.

As shown in FIG. 8 and FIG. 12, the gut removal member 40 configured in this manner is adapted such that the lower end portions of the side plates 43, 43 facing downstream on both sides thereof or the center of the lower end portion of the backplate 44 is pivotally supported 48 on the machine table 1, and the piston rod of the driving device 47 including a fluid pressure cylinder such as an air cylinder disposed on the machine table 1 is coupled to a projected piece 44a that is provided downwardly from the backplate 44.

Then, the distal blade portions 41a, 41a of the right and left membrane separation blades 41, 41 provided on the upper end of the gut removal member 40 are allowed to enter in between the peritoneal membrane portion A5, A5 and the fish meat inner wall A7 on both sides of the vertebra exposed on the head cut-off section A1 of the fish body A being transferred toward the distal blade portions 41a, 41a. At this time, the driving device 47 is actuated so as to quickly swing downwardly the entirety of the gut removal member 40 with the pivotally supported portion 48 of the side plates 43, 43 on both the right and left sides serving as fulcrum. The pair of right and left membrane separation blades 41, 41 are tilted downwardly from the horizontal state with the pivotally supported portion 48 serving as the fulcrum, and the peritoneal membrane portions A5, A5 are peeled off from the fish meat inner wall using the distal blade portions 41a and then shaken off in conjunction with the guts A4 adhered to the inner surface of the peritoneal membrane portions A5, A5.

Upstream of the gut removal device 4, provided is a guide member 7 configured to feed the peritoneal membrane portions A5, A5, which are found on both sides of the vertebra A6 in the fish body A being transferred to the gut removal member 40, to the height position that is opposed to the right and left membrane separation blades 41, 41 at the upper end of the gut removal member 40.

The guide member 7 has one end oriented toward upstream being connected to an end of the horizontal guide bar 31 oriented toward downstream. The guide member 7 is adapted to be inclined upwardly toward the other end that is oriented toward downstream from the one end, so that the other end is opposed close to the center between the distal ends of the pair of right and left membrane separation blades 41, 41. Note that the guide member 7 has a width enough to carry and transfer the vertebra A6 of the fish body A thereon downstream.

Below the guide member 7, provided is an abdominal cavity widening member 8 configured to guide the fish body A toward the membrane separation blades 41, 41 while the abdominal cavity A3 of the fish body A with the abdomen A2 cut open by the abdomen sectioning device 3 is being widened so as to be wider than the separation between the side plates 43, 43 on both sides of the gut removal member 40.

As illustrated in FIG. 3, FIG. 4, and FIG. 8, the abdominal cavity widening member 8 is provided with the following: a narrower guide starting part 8a which is disposed below the guide member 7 and interposed between the sections of the abdomen A2 having been cut off by the abdominal blade 32 of the abdomen sectioning device 3; a guide en route part 8b constituted of horizontally elongated rectangular right and left inclined plate parts 8b1, 8b1 which are inclined upwardly from the guide starting part 8a toward downstream in parallel to the guide member 7 and of which opposing surfaces are gradually widened toward downstream up to the intermediate position in the lengthwise direction; and a wider guide terminating part 8c constituted of right and left horizontal side plates 8c1, 8c1 which are deflected horizontally toward downstream with the maximum width of the right and left inclined plate parts 8b1, 8b1 from the upper inclined ends of the right and left inclined plate parts 8b1, 8b1 of the guide en route part 8b.

The right and left inclined plate parts 8b1, 8b1 of the guide en route part 8b have the opposing faces, which are gradually increased in distance therebetween from the narrower guide starting part 8a toward downstream, for one half thereof up to the lengthwise intermediate position. On the other hand, the other halves and the right and left horizontal side plates 8c1, 8c1 of the guide terminating part 8c are opposed in parallel to each other with the maximum width of the one half of the right and left inclined plate parts 8b1, 8b1 of the guide en route part 8b, and the tip portions of the right and left horizontal plates 8c1, 8c1 of the guide terminating part 8c are placed on the opposing inner surfaces of the opening end portions of the side plates 43, 43 on both sides of the gut removal member 40.

Downstream of the gut removal device 4, provided is the remains removal device 5 configured to remove, for example, a kidney A7 or pieces of guts that are left inside the abdominal cavity A2 of the fish body A from which guts have been removed.

Figure 16:
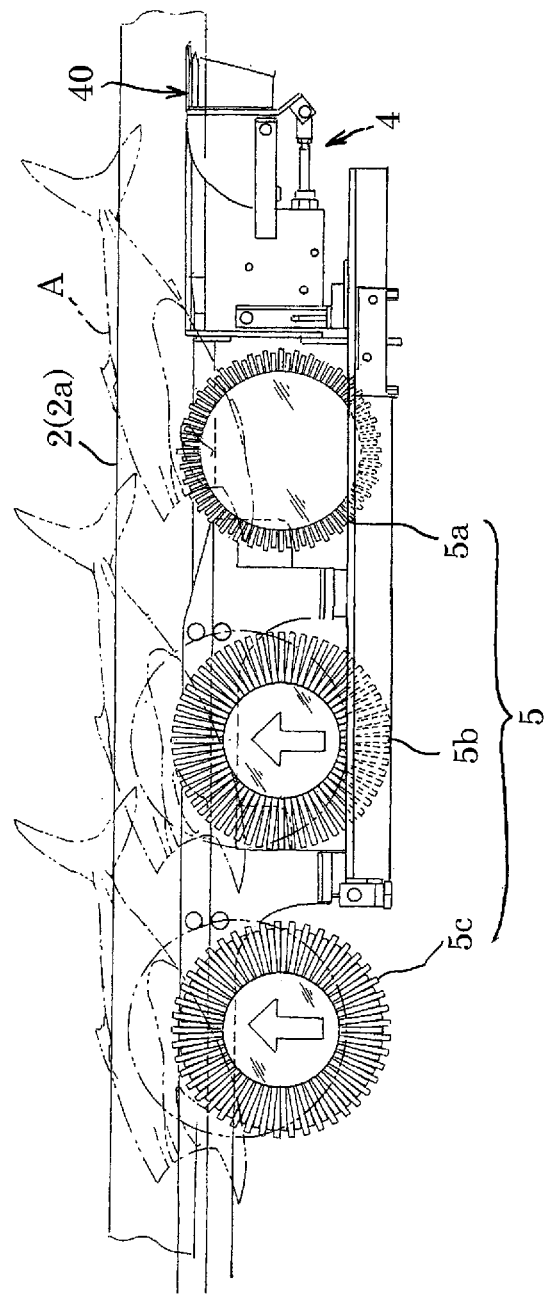
FIG. 16 is a side view of a rotational brush that constitutes the remains removal device.

As shown in FIG. 1 and FIG. 16, the remains removal device 5 is constituted of first to third abdominal cavity cleaning rotational brushes 5a, 5b, 5c which are disposed at predetermined intervals in the direction of the fish body A being transferred by the transfer device 2 that includes the pair of right and left sandwiching belts 2a, 2a. The upper circumference of these rotational brushes 5a, 5b, 5c is located at the center between the opposing faces of the sandwiching belts 2a, 2a to clean the abdominal cavity A3 of the fish body A, which is being transferred from the transfer device 2, with the guts removed.

Figure 18:
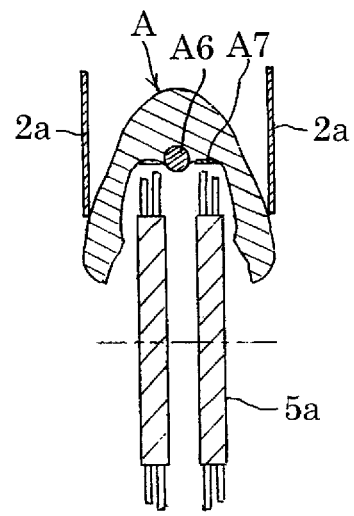
FIG. 18 is a cross-sectional view illustrating a first brush being used for removal.
Figure 19:
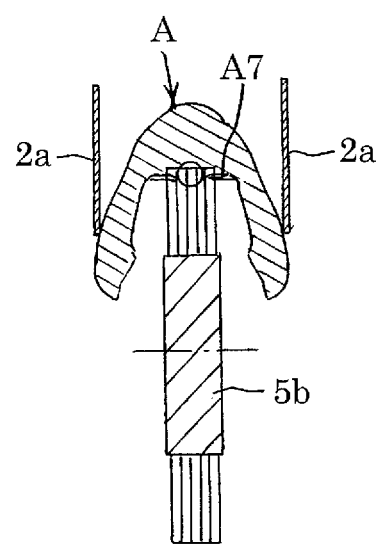
FIG. 19 is a cross-sectional view illustrating a second brush being used for removal.
Figure 20:
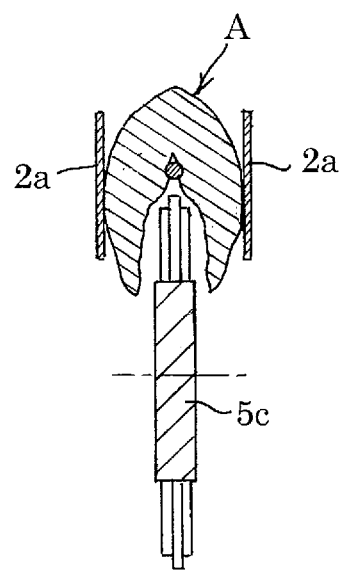
FIG. 20 is a cross-sectional view illustrating a third brush being used for removal.

Furthermore, for these first to third rotational brushes 5a to 5c, as shown in FIG. 18, the first rotational brush 5a disposed subsequent to the gut removal device 4 is constituted of a pair of right and left brushes that are disposed in parallel to each other with a small gap therebetween so as to clean both sides of the fish meat inner wall A7 with the vertebra A6 at the center in the abdominal cavity A3 of the fish body A. As shown in FIG. 19, the second rotational brush 5b is formed to have a thickness that enables cleaning the center of the fish meat inner wall A7 in the width direction that is exposed between the pair of brushes that constitute the first rotational brush 5a. The third rotational brush 5c is configured to be thinner than the second rotational brush 5b and capable of cleaning the reduced-width anus of the abdominal cavity A2 of the fish body A.

These first to third rotational brushes 5a to 5c are disposed to be movable up and down relative to the fish body A, which is being transferred by the transfer device 2, with the guts removed.

Figure 17:
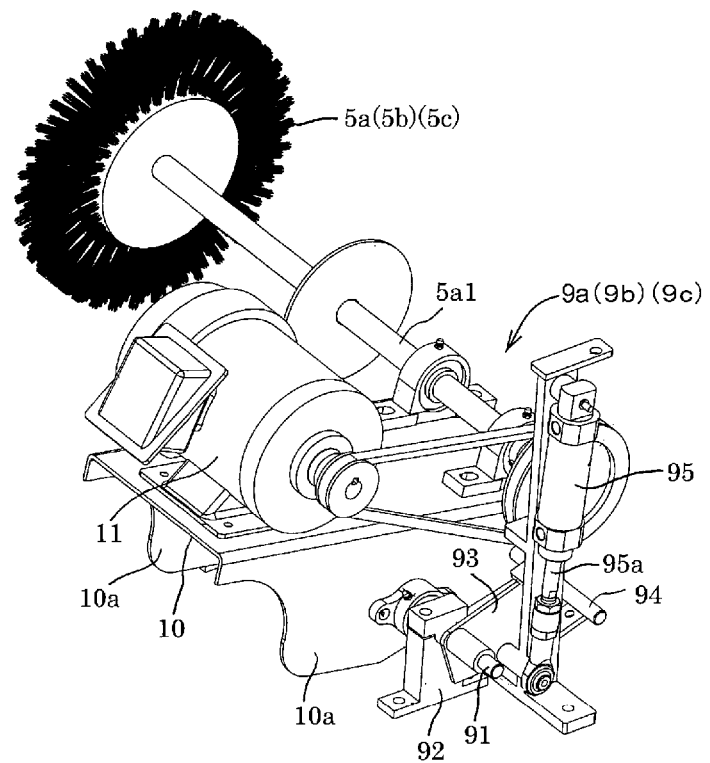
FIG. 17 is a perspective view illustrating a rotational and vertical movement device for a brush of the remains removal device.

Since vertical movement devices 9a to 9c of the first to third rotational brushes 5a to 5c are the same, a description will be given of the vertical movement device 9a of the first rotational brush 5a, and descriptions of the other brush vertical movement devices 9b, 9c will be omitted. As shown in FIG. 17, the brush vertical movement device 9a is configured such that the center portions of both sidewall plates 10a, 10a of a mount table 10 for mounting a motor 11 and the first rotational brush 5a are rotatably supported with a shaft 91, and both end portions of the shaft 91 protruded from the both sidewall plates 10a, 10a are supported with a bearing member 92 secured to the machine table 1. Furthermore, the proximal end portion of a lever member 93 is rotatably supported by the shaft end portion of the shaft 91 protruded from the bearing member 92, and the tip portion of the lever member 93 is coupled by intermediary of a coupling shaft 94 to the tip portion of the sidewall plate 10a of the mount table 10. Furthermore, the upper end portion of a fluid pressure cylinder 95 such as an air cylinder is supported on the machine table 1, and the piston rod 95a of the fluid pressure cylinder 95 is coupled to the center of the lever member 93 in the lengthwise direction.

The motor 11 is disposed on the upper surface on one end side of the mount table 10, while the rotation axis 5a1 of the first rotational brush 5a is rotatably supported on the upper surface on the other end side, so that the rotation of the motor 11 is transferred to the first rotational brush 5a by intermediary of a belt or the like looped over between pulleys. Furthermore, by extending and contracting the piston rod 95a of the fluid pressure cylinder 95, the lever member 93 is swung about the shaft 91 and the provision table 10 is tilted in the vertical direction with the shaft 91 as fulcrum, enabling the first rotational brush 5a to move in the vertical direction.

On the other hand, as illustrated in FIG. 1, the supplying device 6 which is disposed on one end side of the machine table 1 and supplies the fish body A to the transfer start portion of the transfer device 2 with the pair of right and left sandwiching belts 2a, 2a is provided with the following: a belt conveyor 6a; and a pair of right and left guide plates 6b, 6b (only one guide plate is illustrated in the figure) disposed on both sides of the transfer path that runs in the direction of feeding the fish body on the belt conveyor 6a. These guide plates 6b, 6b are inclined so as to come closer to each other from the upper end toward the lower end, so that the fish body A is fed to the transfer device 2 with the abdomen oriented downwardly and both sides of the abdomen supported with the opposing faces of the guide plates 6b, 6b.

Note that although not illustrated, upstream of the abdomen sectioning device 3, upstream of the gut removal member 40, and upstream of the first to third rotational brushes 5a to 5b of the remains removal device 5, there are disposed optoelectronic sensors on the machine table 1 configured to actuate these devices by detecting the fish body A being transferred by the transfer device 2.

A description will next be given of an action of the gut removal device, which is configured as described above, for the fish body A. The fish body A with the head cut off is supplied onto the belt conveyor 6a of the supplying device 6, which is disposed on one end of the machine table 1, while the head cut-off section is oriented in the transfer direction with the abdomen A1 oriented downwardly. Note that the fish body A may be supplied to the supplying device 6 by a worker or alternatively not by a worker but by disposing, on the one end of the machine table 1, a conveyor in a direction orthogonal to the direction in which the fish body is transferred on the machine table 1 and using a device configured to sequentially push the fish body A being transferred on the conveyor onto the belt conveyor 6a.

The fish body A having been supplied onto the belt conveyor 6a is transferred on the belt conveyor 6a toward the abdomen sectioning device 3 while being retained in an erected state with both the flanks supported on the right and left guide plates 6b, 6b and the back oriented upwardly. The fish body A is fed in between the sandwiching belts 2a, 2a of the transfer device 2 from the transfer terminal portion of the belt conveyor 6a and then started to be transferred downstream while both the flanks are sandwiched and held by the sandwiching belts 2a, 2a.

As illustrated in FIG. 3, at the transfer start portion of the sandwiching belts 2a, 2a, the fish body A having been sent out of the belt conveyor 6a is moved from the push-up member 34a of the push-up lever 34 onto the horizontal guide frame 33 in the abdomen sectioning device 3. Then, the tip of the horizontal guide bar 31 is pierced into the lower vicinity of the vertebra A6 at the upper end portion of the front end surface of the abdominal cavity A3 that is exposed on the head cut-off section.

When being fed into the abdomen sectioning device 3, the fish body A is detected by the optoelectronic sensor. The output signal from the optoelectronic sensor causes a device configured to drive the push-up lever 34, i.e. the fluid pressure cylinder 36 (illustrated in FIG. 6), to be actuated and thereby contract the piston rod 36a. This allows the push-up lever 34 to be swung upwardly as denoted by the dotted lines in FIG. 5. As the fish body A is transferred by the transfer device 2 while the push-up member 34a holds the tail side of the fish body A upwardly with a point on the horizontal guide frame 33 serving as fulcrum, the horizontal guide bar 31 is penetrated through the abdominal cavity A3 and projected out of the anus A8 of the fish body A. While the horizontal guide bar 31 and the pressing member 35 pressing the back of the fish body A from above are used to hold the fish body A in a forwardly inclined attitude with the entire belly thereof suspended downwardly from the horizontal guide bar 31, the abdominal blade 32 is used to cut the abdomen A2 of the fish body A from the head cut-off section A1 to the anus A8.

Note that for cutting the abdomen of the fish body A open, the one abdominal blade 32 mentioned above is used to cut open the abdomen A2 while the belly of the fish body A is left. However, in place of such an abdominal blade 32, a pair of right and left semi-fillet knives (not illustrated), the upper circumferences of which are inclined to be close to each other, may be employed so that the semi-fillet knives are used to cut open the abdomen of the fish body A by cutting the upper end portion of the belly on both sides of the abdomen the fish body and removing the belly.

As the fish body A with the abdomen A2 cut open by the abdominal blade 32 is transferred from the horizontal guide bar 31 by the sandwiching belts 2a, 2a, the fish body A reaches the guide member 7 which is connected to the horizontal guide bar 31 and inclined upwardly from the horizontal guide bar 31 toward downstream. Then, the fish body A is transferred toward the gut removal device 4 while the vertebra A6 exposed on the head cut-off section A1 of the fish body is carried on the guide member 7 and being held upwardly by being inclined by the guide member 7.

The upwardly inclined end of the guide member 7 is opposed close to the pair of right and left membrane separation blades 41, 41 of the gut removal member 40 in the gut removal device 4. The fish body A is transferred to the upwardly inclined end of the guide member 7, and the peritoneal membrane portions A5, A5 of both sides of the vertebra A6 on the head cut-off section A1 are opposed to the lower surface of the pair of right and left membrane separation blades 41, 41.

Furthermore, as the fish body A is transferred downstream on the guide member 7, the narrower guide starting part 8a of the abdominal cavity widening member 8 disposed below the guide member 7 is brought into the abdominal cavity A3 that has been cut open. Then, as the fish body A is transferred on the guide member 7, the right and left inclined plate parts 8b, 8b of the abdominal cavity widening member 8 that are gradually widened cause the abdominal cavity A3 to be gradually widened to be wider than the interval between the membrane separation blades 41, 41 on both sides of the gut removal member 40. The fish body A is opposed to the gut removal member 40 while the width of the abdominal cavity is being held by the guide terminating part 8c of the abdominal cavity widening member 8.

Figure 14:
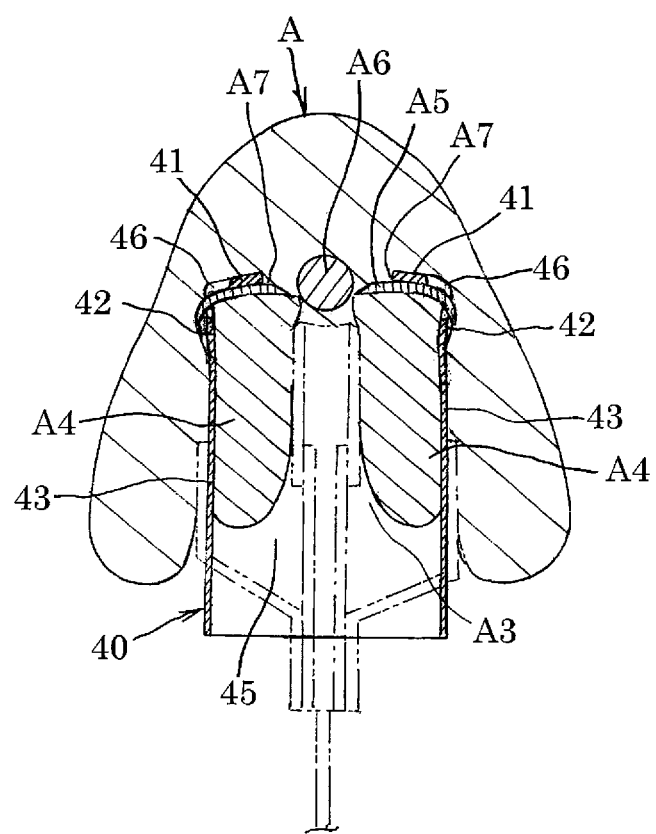
FIG. 14 is a cross-sectional view illustrating guts having been received in a space between both side plates of the gut removal member.
Figure 15:
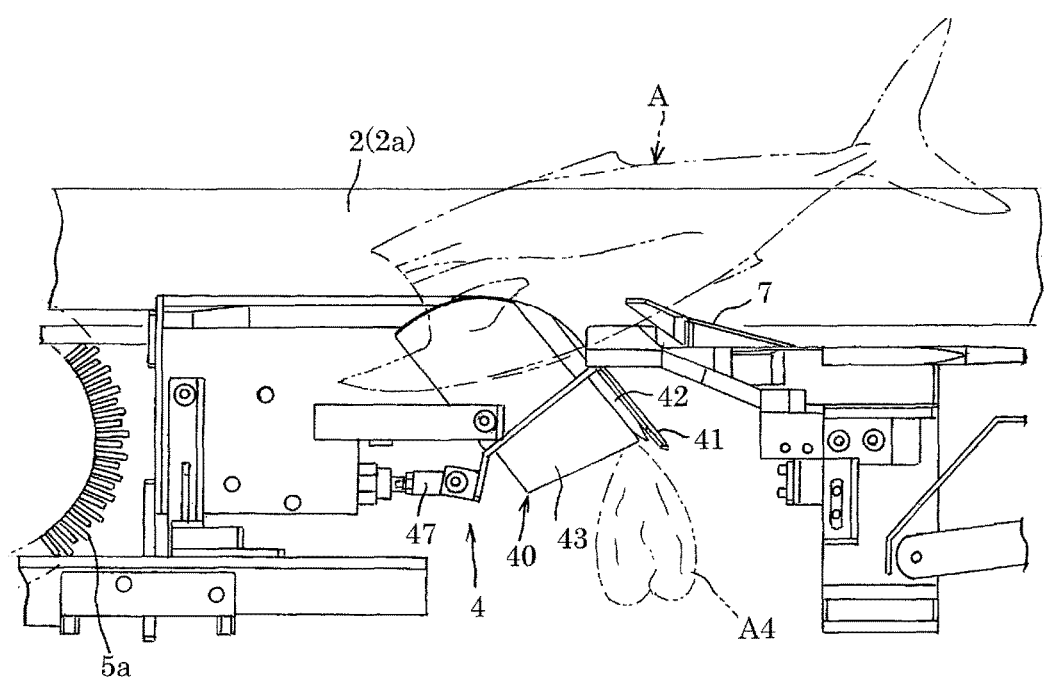
FIG. 15 is a side view illustrating guts shaken off from the gut removal member.

When the fish body A is transferred to the gut removal device 4 by the transfer device 2, as shown in FIG. 12 and FIG. 14, the fish body A is detected by the optoelectronic sensor, so that the pair of right and left membrane separation blades 41, 41 and the side separation blades 42, 42 of the gut removal member 40 are allowed to enter a predetermined depth from the head cut-off section A1 of the fish body A so as to sandwich the peritoneal membrane portions A5, A5 present on both sides of the vertebra A6. At this time, as shown in FIG. 15, the driving device 47 including a fluid pressure cylinder is actuated, and the entire gut removal member 40 is swung downwardly with the lower end pivotally supported portion 46 of the side plates 43, 43 on both sides serving as fulcrum. The pair of right and left membrane separation blades 41, 41 are tilted downwardly in conjunction with the side separation blades 42, 42 from a horizontal state with the pivotally supported portion 46 serving as fulcrum, so as to peel off the peritoneal membrane portions A3 and A3 on both sides of the vertebra A6 of the fish body A from the fish meat inner wall, and shake off downwardly the guts A4 adhered to the inner surface of the peritoneal membrane portions A5, A5 and thereby remove the same out of the abdominal cavity A2.

The action of removing the guts of the fish body A by the gut removal member 40 will be described in more detail. The fish body A is fed into the gut removal member 40 by the transfer device 2 while being guided by the guide member 7 with the abdomen being widened by the abdominal cavity widening member 8. Then, as shown in FIG. 12 and FIG. 14, the membrane separation blades 41, 41 of the gut removal member 40 are allowed to enter in between the peritoneal membrane portions A5, A5 on both sides of the vertebra A6 on the head cut-off section A1 of the fish body A and the fish meat inner wall A7. On the other hand, the side separation blades 42, 42 provided on the outer end lower portion of the membrane separation blades 41, 41 at the peritoneal membrane portions A5, A5 break through, by the tip thereof, the upper both sides of the peritoneal membrane that covers the guts A4. Meanwhile, the side separation blades 42, 42 are allowed to enter along the lower surfaces of the outer end portions of the peritoneal membrane portions A5, A5 on both sides of the vertebra A6.

Figure 13:
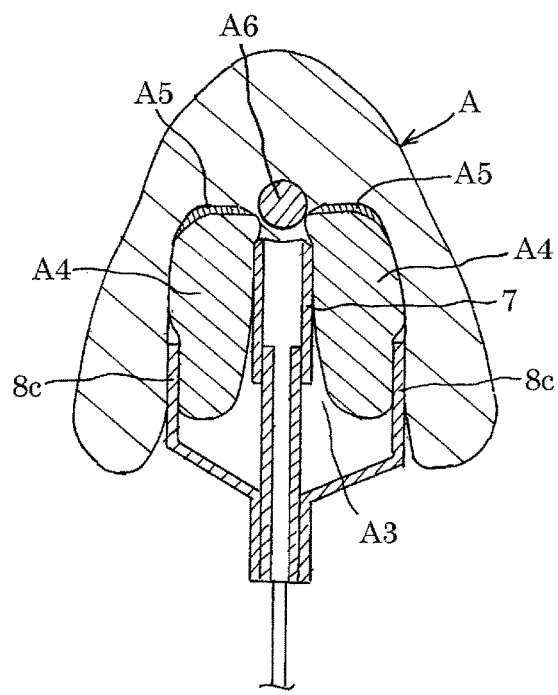
FIG. 13 is a cross-sectional view illustrating a fish body when viewed from the head cut-off section.

As described above, the membrane separation blades 41 and the side separation blades 42 are allowed to enter into the head cut-off section A1 along the upper and lower sides of the peritoneal membrane portions A5, A5 on both sides of the vertebra A6. This causes the outer end portion at the tip of the peritoneal membrane portions A5, A5 to enter a wedge-shaped gap 45 between the membrane separation blade 41 and the side separation blade 42 so as to engage the same. On the other hand, the side plates 43, 43 on both sides of the gut removal member 40 are inserted along the inner surface of the guide terminating part 8c of the abdominal cavity widening member 8, so that as shown in FIG. 13, the guts A4 inside the abdominal cavity A2 that has been widened by the abdominal cavity widening member 8 are received in the space between the side plates 43, 43.

In this state, the gut removal member 40 is swung as shown in FIG. 15 with the lower end of the side plate 43 serving as fulcrum, so that the distal blade portions 41a of the membrane separation blades 41, 41 and the tapered blade portions 42a of the side separation blades 42, 42, which are oriented toward upstream, are inclined from a horizontal state downwardly as if bowing down. This causes the peritoneal membrane portions A5, A5 entering the wedge-shaped gap 45 in an engaging state to be pulled apart downwardly from the fish meat inner wall A7 while being sandwiched and held between the membrane separation blades 41, 41 and the side separation blades 42, 42. At the same time, the membrane separation blades 41, 41 are hooked on the peritoneal membrane portions A5, A5 from the upper surface toward the lower surface of the peritoneal membrane portions A5, A5, so that the downward swinging force (tilting force) of the membrane separation blades 41, 41 causes the peritoneal membrane portions A5, A5 to be pulled apart from the fish meat inner wall A7.

At this time, the peritoneal membrane portions A5, A5 present on both sides of the vertebra A6 with the vertebra A6 at the center are continued to each other even below the vertebra A6 and peeled off in conjunction with the peritoneal membrane portions A3 and A3, so that a kidney B found along the lower surface of the vertebra A6 is exposed. On the other hand, the peritoneal membrane along the inner surface of the abdominal cavity A2 is continued on both outer ends of the peritoneal membrane portions A5, A5. The peritoneal membrane is reduced in thickness as compared with the peritoneal membrane portions A5, A5. Thus, the peritoneal membrane may be torn when the peritoneal membrane portions A5, A5 are peeled off, so that part thereof may remain in the state of being adhered to the inner surface of the abdominal cavity A3.

However, the adhesion of the guts A4 to the peritoneal membrane that sheathes the inner surface of the abdominal cavity A3 is significantly low, and the guts A4 have the upper circumferential surface that is in intimate contact with the lower surface of the peritoneal membrane portions A5, A5.

Thus, when the peritoneal membrane portions A5, A5 are peeled off by the membrane separation blades 41, 41, the guts A4 are also peeled off in conjunction with the peritoneal membrane portions A5, A5. When the side plates 43, 43 which are on both sides and provided with the membrane separation blades 41, 41 are tilted, the guts A4 are shaken off downwardly in conjunction with the peritoneal membrane portions A5, A5 and thereby removed out of the space 45 surrounded by the side plates 43, 43 on both side and the backplate 44.

Note that as the gut removal member 40, the side separation blades 42, 42 are not always required depending on the type of fish. The membrane separation blades 41, 41 may be provided on the upper ends of the side plates 43, 43 on both sides, so that as described above, the pair of right and left membrane separation blades 41, 41 are caused to enter in between the peritoneal membrane portions A5, A5 and the fish meat inner wall A6 on both sides of the vertebra A6 on the head cut-off section of the fish body A and then tilted downwardly. This may also make it possible to peel off the peritoneal membrane portions A5, A5, to which the guts A4 are adhered, from the fish meat inner wall A7 and thereby remove the guts A4.

The fish body A, the guts A4 of which have been removed in this manner by the gut removal device 4, is transferred to the remains (such as kidney) removal device 5 which is provided downstream of the gut removal device 4 while being sandwiched and held between the sandwiching belts 2a, 2a of the transfer device 2. The remains removal device 5 is provided with the first to third abdominal cavity cleaning rotational brushes 5a, 5b, 5c, so that when the fish body A passes sequentially on the first to third abdominal cavity cleaning rotational brushes 5a, 5b, 5c, the kidney remaining in the abdominal cavity A3 or part of remaining guts is removed out of the abdominal cavity A3.

The first rotational brush 5a includes a pair of right and left brushes disposed in parallel to each other. When the fish body A is sensed by the optoelectronic sensor when having reached in front of the first rotational brush 5a, the vertical movement device 9a of the first rotational brush 5a is actuated, so that the first rotational brush 5a is moved upwardly and then scrapes off and thereby removes remains adhered to the fish meat inner wall A6 while being pushed against both sides of the fish meat inner wall A7 on both sides of the vertebra A6 in the abdominal cavity A3 of the fish body A. After that, the first rotational brush 5a is moved downwardly to the original position.

The fish body A is sensed by the optoelectronic sensor when having subsequently reached in front of the second rotational brush 5b, so that the vertical movement device 9b of the second rotational brush 5b is actuated to move the second rotational brush 5b upwardly. Then, while being pushed against remains such as kidney adhered to the lower part of the vertebra A6 that the first rotational brush 5a could not scrape off, the second rotational brush 5b scrapes off the remains and is then moved downwardly to the original position.

The fish body A is sensed by the optoelectronic sensor when having further subsequently reached in front of the third rotational brush 5c, so that the vertical movement device 9c of the third rotational brush 5c is actuated to move the third rotational brush 5c upwardly. Then, the third rotational brush 5c scrapes off remains, which are adhered to the inner wall of the abdominal cavity A3 portion that is narrower near the anus and which the first and second rotational brushes 5a, 5b could not scrape off, and is then moved downwardly to the original position. The fish body A, the abdominal cavity A3 of which has been cleaned by the gut removal device 4, is sent out from the transfer terminal of the transfer device 2.

Note that the remains removal device 5 employs three rotational brushes, but may also be constituted of one or two rotational brushes.

INDUSTRIAL APPLICABILITY

According to the present invention, it is possible to achieve a device for removing guts of a fish body which is capable of removing smoothly with reliability the guts of fish bodies, of which head has been cut off, while transferring the fish bodies one after another.

CROSS-REFERENCE TO RELATED APPLICATION

The present application claims the priority under Japanese Patent Application No. 2016-76551 filed on Apr. 6, 2016, the disclosure of which is hereby incorporated in its entirety by reference.

REFERENCE SIGNS LIST 1 machine table
2 transfer device
3 abdomen sectioning device
4 gut removal device
40 gut removal member
41, 41 membrane separation blade
42, 42 side separation blade
43, 43 side plate
44 backplate
5 remains removal device
6 supplying device
7 guide member
8 abdominal cavity widening member
9a to 9c vertical movement device
A fish body
A1 head cut-off section
A2 abdomen
A3 abdominal cavity
A4 guts
A5, A5 peritoneal membrane portion
A6 vertebra
A7 fish meat inner wall

The invention claimed is:

1. A method for removing guts of a fish body, comprising the steps of:
   transferring a fish body with a head cut off and removed while a head cut-off section is oriented in a transfer direction and an abdomen is kept oriented downwardly;
   cutting open the abdomen of the fish body on a way of transferring the fish body;
   feeding the fish body with the abdomen cut open to a gut removal member that is provided, on an upper end thereof, with a pair of right and left membrane separation blades;
   causing the pair of right and left membrane separation blades to enter, in the feeding step, in between a side portion of a peritoneal membrane and a fish meat inner wall on both sides of a vertebra exposed on the head cut-off section of the fish body; and
   downwardly tilting the gut removal member on a way of the entering step and then peeling off the peritoneal membrane having an inner surface, to which guts are adhered, from the fish meat inner wall by the membrane separation blades and shaking off the peritoneal membrane in conjunction with the guts.

2. The method for removing guts of a fish body according to claim 1, wherein
   side separation blades are provided at outer end lower portions of the pair of right and left membrane separation blades of the gut removal member by intermediary of a wedge-shaped gap,
   an outer end portion of both sides of the peritoneal membrane is engaged in the wedge-shaped gap between the membrane separation blade and the side separation blade, and
   the gut removal member is tilted from this state to peel off the peritoneal membrane with the membrane separation blades and side separation blades.

3. The method for removing guts of a fish body according to claim 1, wherein
   an abdominal cavity widening member is provided on a way in which the fish body with the abdomen cut open is transferred to the gut removal member, and
   the fish body is transferred to the gut removal member while an abdominal cavity thereof is being widened by the abdominal cavity widening member.

4. The method for removing guts of a fish body according to claim 1, wherein
   a rotational brush for cleaning an abdominal cavity of the fish body is provided on a way in which the fish body with the guts removed is transferred, and
   when the fish body has reached the rotational brush for cleaning the abdominal cavity, the rotational brush for cleaning the abdominal cavity is moved upwardly to remove kidney or remains left inside the abdominal cavity.

5. A device for removing guts of a fish body, comprising:
   a transfer device configured to transfer a fish body, with a head cut off and removed, while a head cut-off section is oriented in a transfer direction and an abdomen thereof is kept oriented downwardly;
   an abdominal blade which is provided upstream of the transfer device and cuts open the abdomen of the fish body with the head cut off and removed;
   a gut removal member provided downstream of the abdominal blade and capable of being tilted downwardly, the gut removal member being provided, on an upper end thereof, with a pair of right and left membrane separation blades to be caused to enter in between a peritoneal membrane portion and a fish meat inner wall that are present on both sides of a vertebra of the fish body; and
   a guide member disposed upstream of the gut removal member, the guide member being configured to carry the vertebra of the fish body with the abdomen cut open and feed the vertebra to the membrane separation blades so that the peritoneal membrane portions on both sides of the vertebra are opposed to the pair of right and left membrane separation blades of the gut removal member.

6. The device for removing guts of a fish body according to claim 5, wherein
   the gut removal member is provided, on an outer end of the pair of right and left membrane separation blades, with a side separation blade oriented downward, and the side separation blade has a tapered blade portion with a tip formed an acute end by intermediary of a wedge-shaped gap for receiving the peritoneal membrane of the fish body; and a side plate is vertically provided downwardly from these side separation blades, a backplate is provided between end portions facing downstream of these side plates, and a space surrounded by the side plates on both sides and the backplate is formed as a space for receiving the guts of the fish body.

7. The device for removing guts of a fish body according to claim 5, wherein below the guide member disposed upstream of the gut removal member, an abdominal cavity widening member configured to guide the fish body toward the membrane separation blades while widening the abdominal cavity of the fish body with the abdomen cut open to be wider than an interval between the side plates on both sides of the gut removal member is disposed.

8. The device for removing guts of a fish body according to claim 5, wherein downstream of the gut removal member, a rotational brush configured to clean the abdominal cavity to remove kidney or remains inside the abdominal cavity of the fish body with the guts having been removed is disposed to be vertically movable.

* * * * *